Inventor
Mathias Tong Yuan Tong
By Cushman, Darby & Cushman
Attorneys

Inventor
Mathias Tong Yuan Tong
By Cushman, Darby & Cushman
Attorneys

Inventor
Mathias Tong Yuan Tong
By Cushman, Darby & Cushman
Attorneys

United States Patent Office 3,319,172
Patented May 9, 1967

3,319,172

SYNCHRONOUS DETECTION CIRCUITS

Mathias Tong Yuan Tong, Paris, France, assignor to Compagnie d'Applications Mecaniques à l'Electronique, au Cinema et à l'Atomistique (CAMECA)

Filed Apr. 14, 1964, Ser. No. 359,610
Claims priority, application France, Apr. 17, 1963, 359,610
2 Claims. (Cl. 328—133)

The present invention relates to synchronous detector circuits of the two triode or transistor type.

It is known that, in double triode synchronous detection circuits, the detected signal is extremely sensitive to the amplitude variations of the locally supplied square wave signal which is combined with the incoming signal to be detected. By double triode circuit is here meant a circuit comprising two vacuum tube or semiconductor devices, having each at least three electrodes.

It is an object of the invention to avoid this drawback. To this end the invention provides an improved synchronous detection circuit, whose output is much less liable to vary with the amplitude variations of the local signal.

The synchronous detection circuit according to the invention essentially comprises two double triode circuits associated to provide an output signal practically independent of the local signal amplitude.

The invention will be best understood from the following description with reference to the appended drawing in which.

Figure 1:
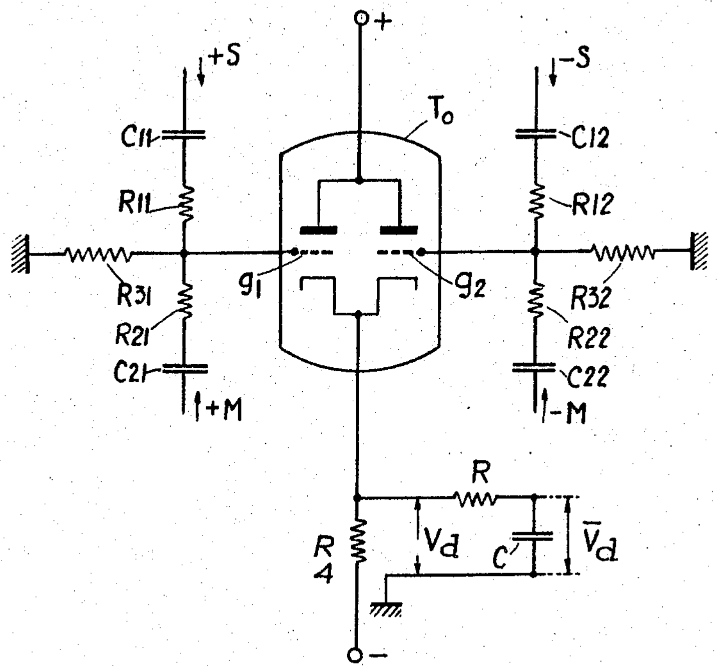
FIG. 1 PRIOR ART
FIG. 1 shows a conventional double triode type synchronous detector.
Figure 3:
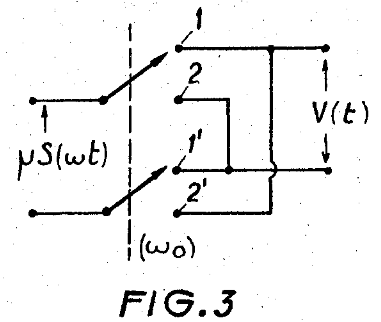
Figure 4:
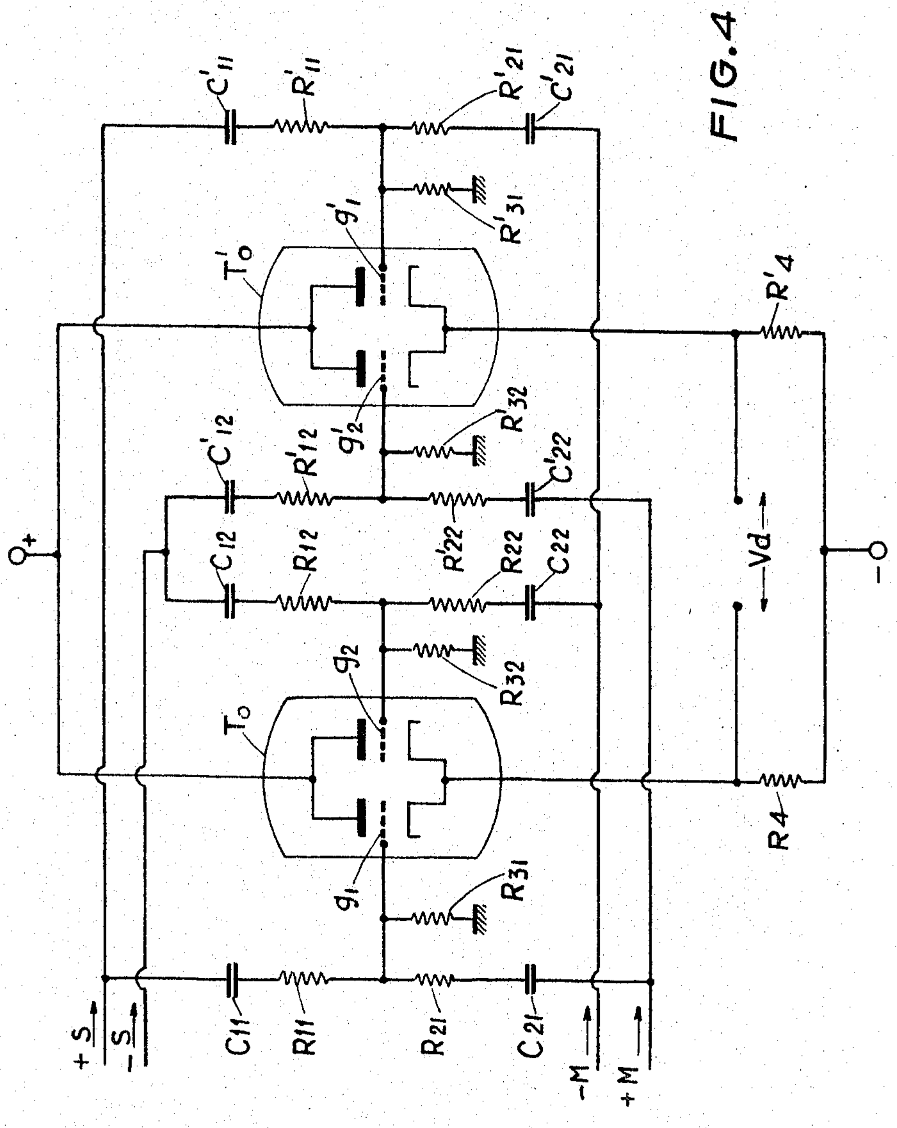

FIG. 3 discloses a simplified diagram which affords a better understanding of the circuit of FIG. 1; and FIG. 4 shows a synchronous detection circuit according to the invention.

It is recalled that the synchronous detection consists essentially in mixing the incoming periodical signal to be detected with a locally supplied periodical signal of the same frequency and constant amplitude. More specifically, in the case of a double triode synchronous detector, the incoming wave $S(\omega t)$ and its opposite $-S(\omega t)$ are combined with a square wave $M(t)$, of the same period $T=2\pi/\omega$, and its opposite $-M(t)$.

Signals —S and —M are readily obtained. For example, the incoming signal and its opposite can be supplied by an amplifier, with symmetrical outputs and signals M and —M by a local oscillator with symmetrical outputs.

Referring to FIG. 1, there is shown a double triode $T_0$, whose plates are directly coupled to the positive terminal of a D.-C. power supply, and whose cathode is coupled through a resistor $R_4$ to the negative terminal of the same source. Grids $g_1$ and $g_2$ are respectively grounded through equal resistors $R_{31}$ and $R_{32}$. Grid $g_1$ receives signal S through a coupling capacitor $C_{11}$ and a resistor $R_{11}$ and signal M through a coupling capacitor $C_{21}$ and a resistor $R_{21}$. Grid $g_2$ receives signal —S through a capacitor $C_{12}$ and a resistor $R_{12}$ and signal —M through a capacitor $C_{22}$ and a resistor $R_{22}$. Components $R_{12}$, $R_{22}$, $R_{32}$, $C_{12}$ and $C_{22}$, on the one hand, and the components $R_{11}$, $R_{21}$, $R_{31}$, $C_{11}$ and $C_{21}$ on the other hand, are respectively identical. Components R and C build up a filter at the output of which signal $V_d$ is collected. The potentials of the grids $g_1$ and $g_2$ are respectively $$V_{g1}=\lambda M(t)+\mu S(t)$$
$$V_{g2}=-\lambda M(t)-\mu S(t)$$

wherein $$\lambda=\frac{R_{11}\cdot R_{31}}{R_{21}(R_{11}+R_{31})+R_{11}\cdot R_{31}}=\frac{R_{12}\cdot R_{32}}{R_{22}(R_{12}+R_{32})+R_{12}\cdot R_{32}}$$

and $$\mu=\frac{R_{22}\cdot R_{32}}{R_{12}(R_{22}+R_{32})+R_{22}\cdot R_{32}}=\frac{R_{12}\cdot R_{31}}{R_{11}(R_{21}+R_{31})+R_{21}\cdot R_{31}}$$

The common cathode potential V*d*, which is the filtered output signal of the detector, follows, to within a fixed bias voltage, the higher grid potential.

Figure 2:
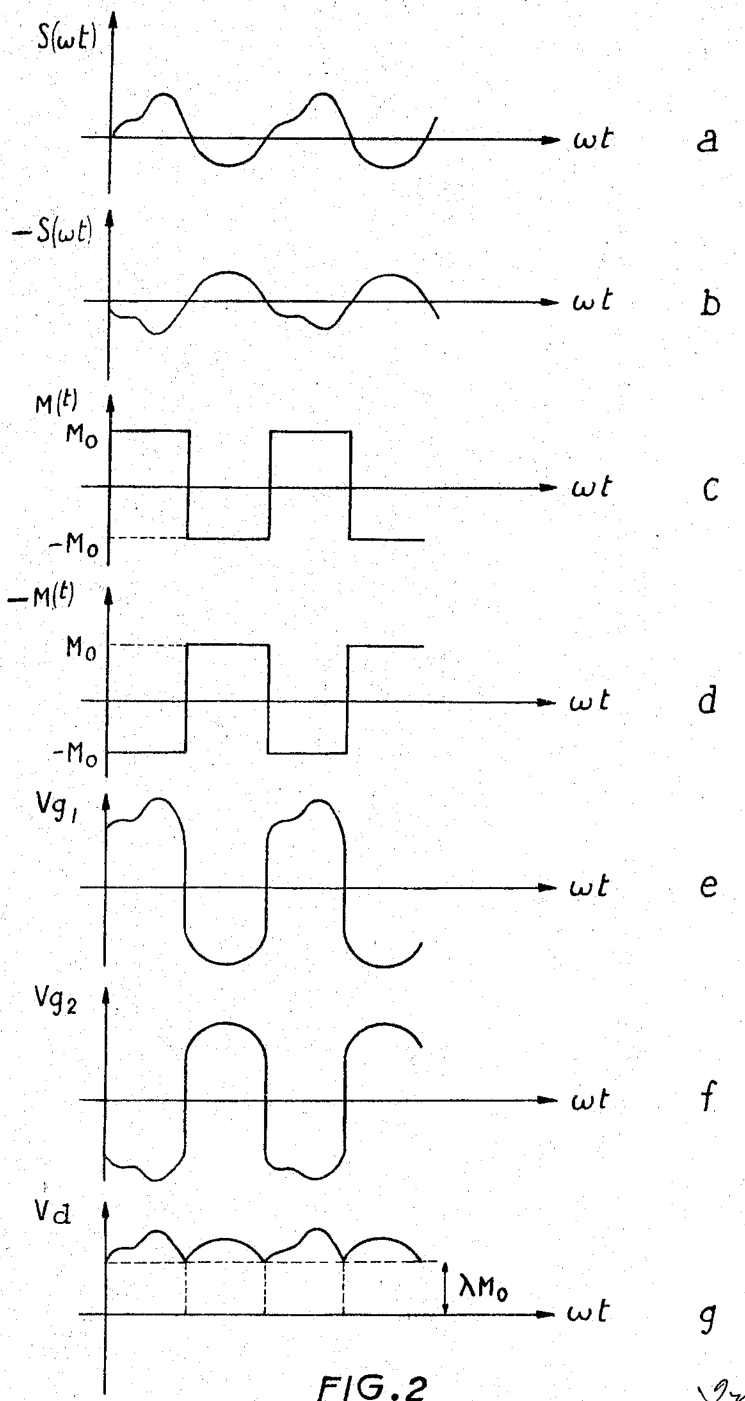
FIG. 2 shows the various signals which are combined in the circuit of FIG. 1.

Referring to FIG. 2, curves *a*, *b*, *c*, and *d* show respectively signals S, —S, M and —M, curves *e* and *f* voltages $V_{g1}$ and $V_{g2}$, and curve *g* voltage V*d* as a function of time.

Voltage V*d* is the sum of a D.-C. component $\lambda M_o$, $M_o$ being the amplitude of the square wave $M(t)$, and of an A.-C. signal $V(t)$ which can be diagrammatically derived from signal $S(\omega t)$ by means of the arrangement of FIG. 3 which is essentially a reversing switch with four terminals 1, 2 and 1', 2', operating at the fundamental frequency of $S(\omega t)$; i.e. being in position 1, 1', during the first half period and in position 2, 2' during the following half period. It can thus be said that $V(t)$ results from the multiplication of $\mu S(\omega t)$ and the transfer function $\tau$ of the reversing switch. This function is a square wave signal of period T, varying between +1 and —1.

Then, $$\tau=\frac{4}{\pi}\left[\cos\omega t+\frac{1}{3}\cos 3\omega t+\ldots+\frac{1}{2n+1}\cos(2n+1)\omega t+\ldots\right]$$
$$V(t)=\mu\tau S(\omega t)$$

and $$V_d=\lambda M_0+\mu\tau S(\omega t)$$

$S(\omega t)$ being of the form:

$$S(\omega t)=S_1\sin(\omega_0 t+\varphi_1)+S_2\sin(2\omega_0 t+\varphi_2)+S_3\sin(3\omega_0 t+\varphi_3)+\ldots$$

one can write:

$$V_d=\lambda M_0+\mu[S_1\sin(\omega_0 t+\varphi_1)+S_2\sin(2\omega_0 t+\varphi_2)+S_3\sin(3\omega_0 t\ \varphi_3)+\ldots]\left[\frac{4}{\pi}\left(\cos\omega t+\frac{1}{3}\cos 3\omega t+\frac{1}{5}\cos 5\omega t\right)+\ldots\right]$$

The D.-C. component of the signal, at the output of filter RC coupled to the cathodes is:

$$\overline{V}_d=\lambda M_0+\frac{\mu}{2\pi}\int_0^{2\pi}\tau S(\omega t)d(\omega t)$$

or $$\overline{V}_d=\lambda M_0+\frac{2\mu}{\pi}\left(S_1\cos\varphi_1+\frac{S_3}{3}\cos\varphi_3+\frac{S_5}{5}\cos\varphi_5+\ldots\right)$$

It can be seen that the harmonics of the order $2n$ are cancelled, while the amplitudes of the harmonic of the order $(2n+1)$ divided by $(2n+1)$.

If now a low-pass filter is inserted, say in the amplifier circuit providing signal $S(\omega t)$, which filter eliminates the harmonics starting from the third harmonic, the filter RC being such that $RC>1/\omega_0$, one obtains at the output of this latter filter a D.-C. voltage $$\overline{V}_d=\lambda M_0+\frac{2\mu}{\pi}S_1\cos\varphi_1$$

This arrangement thus makes it possible to separate a fundamental component from the noise components. However, the arrangement has a substantial drawback. $M_0$ being generally great compared to $S(\omega t)$ to insure the linearity of the detector over a wide range, signal $V_d$ so obtained will be very sensitive to variations of $M_0$. For example, with $M_0=20$ volts for $$\frac{2\mu}{\pi}S_1 \cos \varphi_1=2 \text{ volts}$$

a 5% variation of $M_0$, i.e. a variation by one volt, results in a variation by 1 volt of the amplitude of the detected signal, that is to say a variation equivalent to that produced by a 50% increase of the incoming signal to be detected. In other words the effect due to any drift of signal $M_0$ may be very significant.

FIG. 4 shows a synchronous detector according to the invention.

The circuit comprises two identical double triodes $T_0$ and $T'_0$, similar to the triode of FIG. 1.

Grids $g'_1$ and $g'_2$ receive in the same manner signals +S and −M, on the one hand and, −S and +M, on the other.

The same reference numbers are used for the same components related to tube $T_0$ in FIG. 1 and FIG. 4. Those associated with tube $T'_0$ carry the same reference numbers with a dash. The output filter which is the same as in FIG. 1 has not been shown in FIG. 4. It is inserted between resistors $R_4$ and $R'_4$. The plates of triodes $T_0$ and $T'_0$ are connected to the positive terminal of the supply source and both cathodes are connected to the negative terminal through resistors $R_4$ and $R'_4$ respectively.

According to the relations established above, the output voltage $\overline{V}_d$ can be written:

$$\overline{V}_d=\lambda M_0+\frac{2\mu}{\pi}S_1 \cos \varphi_1-\left(\lambda' M_0-\frac{2\mu'}{\pi}S_1 \cos \varphi_1\right)$$

with $$\lambda'=(R'_{11}\cdot R'_{31})/R'_{21}(R'_{11}+R'_{31})+R'_{11}\cdot R'_{31}$$

and $$\mu'=(R'_{22}\cdot R'_{32})/(R'_{12}(R'_{22}+R'_{32})+R'_{22}\cdot R'_{32}$$

If triodes $T_0$ and $T'_0$ and the related circuits are perfectly identical, $\lambda'=\lambda$ and $\mu'=\mu$, yielding $$\overline{V}_d=\frac{4\mu}{\pi}S_1 \cos \varphi_1$$

In other words the output signal is independent of $M_0$. If there is a difference between $\lambda'$ and $\lambda$ on the one hand and $\mu$ and $\mu'$ on the other, one has $$\overline{V}_d=\frac{2}{\pi}(\mu+\mu')S_1 \cos \varphi_1+M_0(\lambda-\lambda')$$

writing $$\epsilon=\frac{\lambda-\lambda'}{\lambda}$$

it can be written $$\overline{V}_d=\frac{2}{\pi}(\mu+\mu')S_1 \cos \varphi_1+\epsilon\lambda M_0$$

The variation of $\overline{V}_d$ as a function of $M_0$, i.e. $d\overline{V}_d/dM_0$, is divided by $1/\epsilon$ which is quite appreciable. With $\lambda M_0=20$ volts, $$\frac{2\mu}{\pi}S_1 \cos \varphi_1=2 \text{ volts}$$

and assuming $\epsilon=0.05$, which is the usual order of magnitude, $$\overline{V}_d=5 \text{ volts}$$

If then $\lambda M_0$ drifts from 20 volts to 21 volts, i.e. undergoes a 5% variation, $\overline{V}_d$ varies only by 0.05 volt or only 1%.

The invention is obviously not limited to the particular embodiment shown; thus transistor or other tubes may of course be used instead of triodes.

What is claimed is:

1. A synchronous detector circuit for detecting a periodical signal comprising a first double triode having a first and a third grid and a first cathode output; a second double triode having a second and a fourth grid and a second cathode output; means for coupling said triodes in parallel to a high voltage source; means for applying said signal respectively to said first and second grids; means for applying to said third and fourth grids the same signal with a reversed phase; means for applying a square wave with the same period as said signal to said first and fourth grids; means for applying said square wave with a reversed phase to said third and second grids; and means for collecting an output voltage between said first and second cathode outputs.

2. A synchronous detector circuit for detecting a periodical signal comprising: a first double triode having a first and a third grid and a first cathode output; a second double triode having a second and a fourth grid and a second cathode output; means for coupling said triodes in parallel to a high voltage source; identical circuit means for applying said signal respectively to said first and second grids; and for applying to said third and fourth grids the same signal with a reversed phase; identical circuit means for applying a square wave with the same period as said signal to said first and fourth grids and for applying said square wave with a reversed phase to said third and second grids; and means for collecting an output voltage between said first and second cathode outputs.

References Cited by the Examiner

UNITED STATES PATENTS 3,003,024 10/1961 Nygard et al. ________ 178—5.4

DAVID J. GALVIN, *Primary Examiner.*

ARTHUR GAUSS, *Examiner.*

J. JORDAN, *Assistant Examiner.*